United States Patent

[11] 3,612,128

| [72] | Inventors | Nicholas Robert Beck<br>University City, Mo.;<br>Shinji Kurihara, Fukuyama, Japan |
|---|---|---|
| [21] | Appl. No. | 884,073 |
| [22] | Filed | Dec. 11, 1969 |
| [45] | Patented | Oct. 12, 1971 |
| [73] | Assignee | Bibun Machine Construction Company Ltd.<br>Fukuyama, Hiroshima Prefecture, Japan<br>by said Beck |

[54] FOOD-PROCESSING BELT
4 Claims, 5 Drawing Figs.

[52] U.S. Cl. .................................................. 146/76
[51] Int. Cl. .................................................. A22c 17/00
[50] Field of Search .................................... 146/76 R, 222

[56] References Cited
UNITED STATES PATENTS

| 3,396,768 | 8/1968 | Shingi Kurihara ............ | 146/222 |
| 3,429,348 | 2/1969 | Hirtensteiner ................ | 146/76 R |
| 3,524,487 | 8/1970 | Paoli ............................ | 146/222 X |

*Primary Examiner*—William S. Lawson
*Attorney*—Paul M. Denk

ABSTRACT: In an apparatus for separating meat from animal bone, a resilient belt, preferably molded from a solid polyurethane elastomer, is constructed having beveled edges which extend into contiguity with the surface of a perforated revolving drum so as to accommodate a quantity of crushed meat-bearing material into compressibility with said drum; and, the surface of the belt in communication with the drum is knurled or ridged to insure retention of said material compressed against the drum.

PATENTED OCT 12 1971  3,612,128

INVENTORS
NICHOLAS ROBERT BECK
SHINJI KURIHARA
BY
Paul M. Denk
ATTORNEY

FOOD-PROCESSING BELT

CROSS-REFERENCE TO RELATED PATENT

The subject matter of this application is related in part to the subject matter of the patent of Shinji Kurihara, U.S. Pat. No. 3,396,768, and issued on Aug. 13, 1968.

BACKGROUND OF THE INVENTION

This invention relates generally to a belt for compressing meat-bearing material against a revolving drum, and more particularly, relates to a resilient belt preferably formed from solid polyurethane which enhances the retention of the meat-bearing material into compressibility with the rotary perforated drum of a food-processing apparatus.

The prior art is replete with food-processing devices wherein a rubber belt pushes a ground food against a perforated drum for the purpose of removing some unwanted ingredient from the food mass, such as the skins from the edible starchy portion of potatoes, or as performed in the fish industry, the removal of tuna meat from fish bone. More specifically, in the referred-to cross-reference patent, a rubber belt is utilized for compressing a crushed meat material against a perforated revolving drum to effect separation of meat particles from the small pieces of bone that pervade throughout the material. This particular belt as used in conjunction with this apparatus has been effective in achieving some separation of meat particles from a mass of crushed bone and meat, especially where the crushed meat material derives from animals in the poultry field which generally contain a softer bone structure. The effectiveness of a rubber formed belt achieves its highest efficiency at the initial stages of operation of the apparatus when a new belt is employed, but when the apparatus performs this separating process for any substantial length of time, the sharp edges of the bone particles gradually begin to cut into the surface of the rubber belt, frequently causing shreds or rubber to separate from said belt and enter into the agglomeration of the comminuted meat mass, frequently pressing the shreds of rubber along with the purer meat particles through the drum during the separating process. Obviously this result is not desirable and cannot be tolerated in the segregated meat particles, and cannot comply with food standards regulating the use of such meat for human consumption. More significantly, where the category of animals from which the crushed meat, that is, meat including both meat and bone particles, derives from the red meat field, such as beef from cattle, ham or pork from pigs, lamb from sheep, and so forth, the bone structure of such animals is generally more calcareous and of greater size resulting in a much harder and sharper bone particle when crushed into a meat-bearing material prior to its delivery to the aforesaid meat-separating apparatus. As a result, these sharper bone particles have a tendency to immediately commence cutting and shredding of the rubber belt upon initiation of the meat-separating process, frequently causing this type of a belt to wear out within a relatively short period of time. The deficiencies existing in rubber belts are found to be present in belts manufactured from nylon.

Another deficiency in existing belts utilized in combination with a rotary drum for separating meat from bone is that the meat-bearing material has a tendency to become squeezed laterally and discharge from the cavity formed intermediate the belt and the drum, or the material has a tendency to ride upwardly upon the belt and drum to avoid becoming subjected to the forces of compression thereby evading the entering into compressibility with the drum. The major reason for these two drawbacks is essentially due to the smooth surface present upon existing belts which cannot force movement of the meat intermediate that portion of the belt in near contiguity with the rotary drum, and also because the sides of the belt are not constructed to effect a retention of the meat within the same location. Hence, in the operation of these prior art devices, much of the meat-bearing material becomes wasted and soiled due to its being squeezed laterally from the belt, causing its dropping to the ground. Furthermore, the efficiency of the operation of such apparatuses is significantly reduced since the quantity of material that can be fed to the apparatus diminishes due to this accumulation of meat-bearing material at the entrance into the formed compression cavity.

As a result of the foregoing, it is desirable to provide a resilient belt that overcomes these deficiencies present in the prior art.

It is, therefore, the principal object of this invention to provide a solid polyurethane elastomer molded into a food processing belt which is resistant to shredding and tearing, is of high tensile and elastical strength to effect significant compression of meat-bearing material into contiguity with a revolving perforated drum.

It is another object of this invention to provide a food-processing belt having a roughened surface either through knurling or formed ridges which effectively produces adherence and forced movement of the mass of meat-bearing material when it is transferred intermediate and into compression between the revolving drum and said belt.

It is an additional object of this invention to provide a resilient belt for use in compressing meat-bearing material against a rotating drum wherein said belt is provided with beveled edges that effectively constrain the material against the drum during separation of the purer meat particles from the unwanted ingredients.

It is a further object of this invention to provide an improved food-processing belt for use in conjunction with an apparatus for separating meat from bone, which belt is of enhanced strength, resistant to abrasion and tearing, and generally increases the efficiency and effectiveness in separating meat particles from jagged pieces of bone, tendon, and other undesirable meat byproducts.

A further object of this invention is to provide a resilient polyurethane belt which may be easily installed promptly for usage upon a meat-separating apparatus without requiring constant attention such as necessitated through usage of a rubber, nylon, or similar type belt.

These and other objects of this invention will become more apparent to those skilled in the art in light of the following summary, description of the preferred embodiment, and drawing.

SUMMARY OF THE INVENTION

This invention relates to an improved resilient belt for use in conjunction with food-processing machinery. Food processors, especially those directly concerned with the meat-packing industry, usually have an abundance of animal carcasses remaining after the prime cuts of meat have been removed from the slaughtered animal, or as in the case of poultry, poultry bones containing residue meat generally remain after the packer has removed prime slices from the dressed bird. Ordinarily, these residue-meat-containing bones have been disposed of by giving or selling at a low price to other processors for use in pet foods, or even for fertilizers. With the use of an apparatus such as is disclosed in the cross-referenced patent, these carcasses can now be comminuted or crushed into what may be categorized as a meat-bearing mush or material, and then fed into the apparatus to provide for separation of the remaining meat from the residue of crushed bone and other related animal parts. The crushed particles of bone as fed through this type of an apparatus usually include an abundance of sharp edges which make it difficult to achieve the meat separation step, since the belt arrangement used in combination with a perforated rotary drum is susceptible to cutting and tearing when exposed during the compressive pressures to the jagged edges of the compressed meat bearing material. It has been found that the molding or extruding of resilient belts of this invention from a solid polyurethane mixture of the type which forms an elastomer, when properly cured, greatly enhances the strength and endurance of such belts, and significantly lengthens the operating time of the apparatus. The use of polyurethane in the formation of elastomers has been of a more recent origin, and generally entails the chemical reacting of a polyisocyanate, or prepolymer, with a polyhydroxyl under a process which achieves chemical cross-linking to form the elastomer while curing the same to form the solid polyurethane. The reaction generally includes a mixture of di- or poly- functional hydroxyl compounds, e.g. hydroxyl-terminated polyesters or polyethers, with di- or poly-functional isocyanates. Curing and cross-linking of the polyurethane by the use of such curing agents as butanediol, ethylene glycol, or the use generally of any triol, such as polyols of glycol derivatives effectively produces the polyurethane elastomer with sufficient elasticity, tear and tensile strength, and hardness, to function as the resilient belt required in this meat-separating process. Furthermore, producing the solid polyurethane belt having a Shore A hardness within the vicinity of 60 to 65, or thereabout, has been found sufficient to resist abrasion, cutting, or any prompt deterioration of the belt especially when exposed to meat-bearing material containing a significant quantity of jagged bone particles. Furthermore, solid polyurethane elastomers constructed by the one-shot casting process, such as where hydroxyl-isocyanate is reacted in the presence of a catalyst to produce a homogeneous polymer has also been effective in molding a belt for use for the purpose of this invention. Usually, as is known in the polyurethane art, a metal catalyst is utilized in effecting the formation of polymer elastomers by this direct method. In any event, and regardless of which process is utilized in the formation of a solid polyurethane elastomer, the belt constructed of this material has been significantly more efficient, with greater operating life, than any type of food-processing belt heretofore known or used.

The resilient belt of this invention further contemplates the formation of raised or beveled edges along the marginal sides of the belt, with said edges extending into closer proximity with the surface of the rotary drum so as to achieve confinement of the meat-bearing material intermediate the belt and drum thereby reducing the incidence of loss of meat as through its being squeezed laterally off of the belt. Furthermore, the surface of this continuous belt which is exposed to the perforated drum through which the meat particles are compressed is formed having integral ridges or knurling so as to effect adherence or retention of the agglomeration of the meat-bearing mass so that it may be transferred and effectively compressed against the drum, and not continuously squeezed away from entering into what might be considered as the compression cavity intermediate the belt and the drum. As previously discussed, where the side of the belt that is exposed to the drum has only a smooth surface, its ability to transfer and pull the meat into a state of compression against the side of the drum is rendered difficult with the meat having a tendency to slide and ride up upon the belt, being pushed away by the pressures of the rotating drum. The use of a roughened surface, such as through knurling upon the surface of the belt, significantly reduces this detriment, and renders the operation effective.

DESCRIPTION OF THE PREFERRED EMBODIMENT

Figure 1:
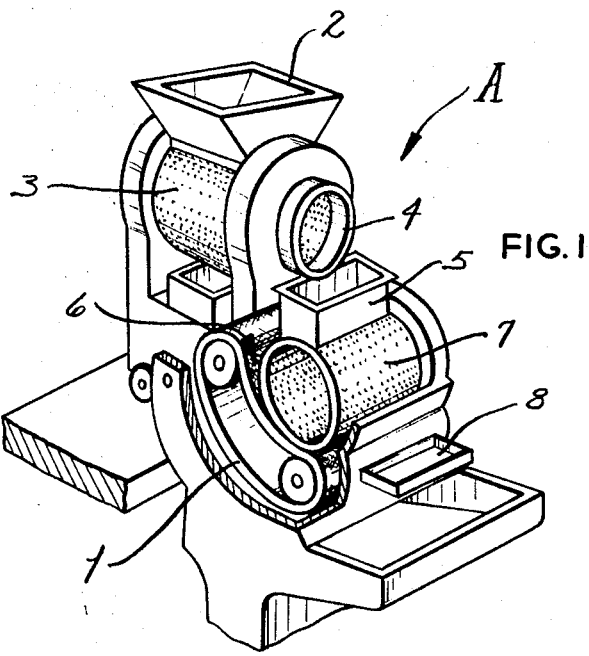
FIG. 1 provides a perspective view of the apparatus for separating meat from bone, including the resilient belt of this invention.

Referring now to the drawing for an illustrative embodiment of the resilient belt of this invention, in FIG. 1, there is generally disclosed the belt 1 as used in combination with a meat-separating apparatus A which generally includes a hopper 2 into which the meat-bearing material is initially fed, with a rotating drum 3, including a multitude of intake openings, providing for an initial separation of larger pieces of bone from the meat-bearing material. Said material as now disposed within the drum 3, exits from its end opening 4 for deposition into a second hopper 5 for discharge approximately the entrance, as at 6 into the space intermediate said resilient belt 1 and a perforated rotary drum 7. The meat-bearing material is compressed snugly against the exterior surface of the drum 7, and due to the combined rotation of said drum and the belt 1, the finer and more purer particles of meat are pushed through the perforations of the drum and into its interior, while the residue bone particles, smaller sinews, and the like, are drawn by the belt along the outside surface of the drum and discharged into a hopper 8 for removal into a receptacle (not shown) as waste material.

Figure 2:
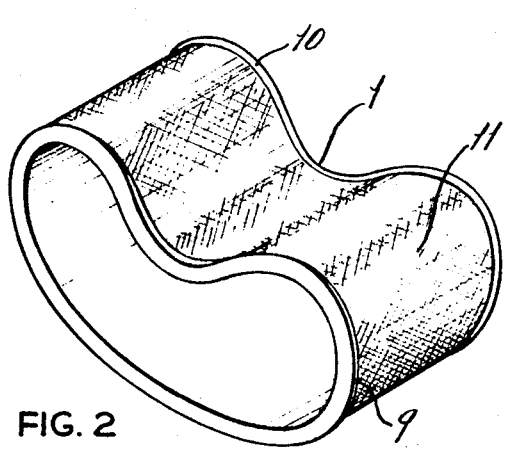
FIG. 2 provides a perspective view of the belt of this invention isolated from the apparatus, but yet sustaining the arcuate shape it undertakes when utilized in a meat-separating operation when installed upon an apparatus.
Figure 4:
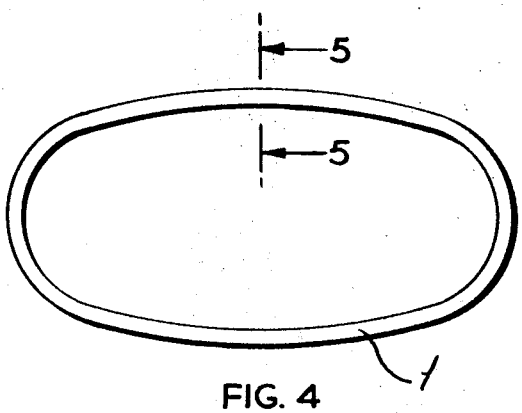
FIG. 4 provides a side view of the belt in its natural shape when removed from the apparatus.
Figure 5:
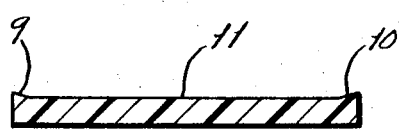
FIG. 5 provides a cross sectional view of the continuous belt taken along the line 5—5 of FIG. 4.
Figure 3:
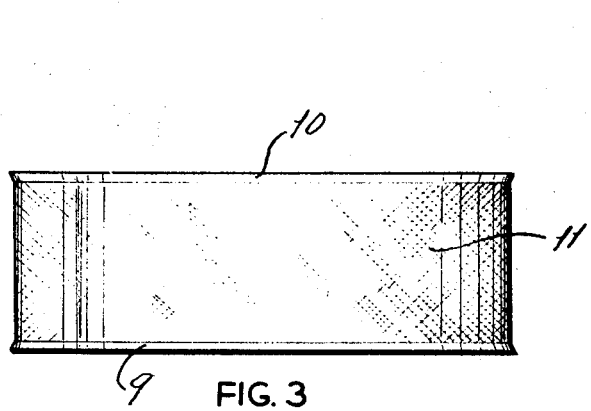
FIG. 3 provides a plan view of the belt disclosed in FIG. 2.

As revealed in FIG. 2, the solid polyurethane belt 1, when disposed in operation, undertakes generally an arcuate shape so as to provide a cradle in mating engagement along approximately the underside of the perforated drum 7, which effectively orients the spacing intermediate the belt 1 and said drum for reception and compression of the raw meat-bearing material. By referring also to FIGS. 3 through 5, it can be seen that the belt 1 includes extending or beveled edges 9 and 10 along the marginal sides of said belt. These beveled edges are formed adjacent the surface 11 of the belt which is usually disposed in the compressive relationship to the periphery of the rotary drum. It can be seen that any meat-bearing material deposited upon the belt will be effectively retained and confined upon the surface of the belt and significantly prevented from creeping or being squeezed from the sides of the belt due to the disposition of its beveled edges 9 and 10. Furthermore, that surface of the belt 11 which is in contiguity with the drum 7 is generally provided with some degree of roughness, such as through ridging, or by knurling as shown, so that sufficient frictional engagement of the belt with the meat-bearing material will result during operation of the apparatus causing an effective transfer of said material into a compressive relationship with the surface of the drum, and prevent it form riding up upon the belt in its natural tendency to avoid entrance into compression, such as occurs with any mushy or comminuted material that is subjected to compression. The beveled edges of the belt have been found to work effectively when formed at an angle within about 5° to 25° of elevation from the surface 11 of the belt, although an angle of 14° is commonly employed. Beveled edges formed at any degree greater than 25° have a tendency to collapse along their extended edges when subjected to the pressures of compression, and beveled edges formed to any degree less than 5° fail to effectively confine the meat-bearing material upon the surface of the belt during the compressing operation.

Numerous variations in the construction of the resilient belt of this invention may occur to those skilled in the art. For example, other methods than those discussed for forming the belt of a polyurethane elastomer, and incorporating different chemical compounds, may be conceived, but these variations are intended to be encompassed by the invention. The disclosed examples are merely illustrative.

Having thus described the invention, what is claimed and desired to be secured by Letters Patent is:

1. In combination with an apparatus for separating meat from bone of the type including a resilient belt for compressing crushed meat-bearing material against a revolving separator drum to effect segregation of meat particles from said meat-bearing material, the improvement which comprises the belt being of substantial width to accommodate an ample quantity of the crushed meat-bearing material into compressibility with substantially the width of the revolving drum, the marginal edges of that surface of the belt in communication with the drum being outwardly beveled to extend towards the surface of the drum and thereby aid in the confinement of the meat-bearing material into compression against said drum.

2. The invention of claim 1 wherein the belt is formed from a solid polyurethane elastomer.

3. The invention of claim 2 wherein the surface of the belt in communication with the revolving drum is knurled intermediate the beveled edges of said belt to increase its retention of the meat-bearing material during compression against said drum.

4. The invention of claim 2 wherein the surface of the belt in communication with the revolving drum is ridged intermediate the beveled edges of said belt to increase its retention of the meat bearing material during compression against said drum.